April 10, 1934.  W. J. ANDRES  1,954,519
BRAKE
Filed Dec. 16, 1931
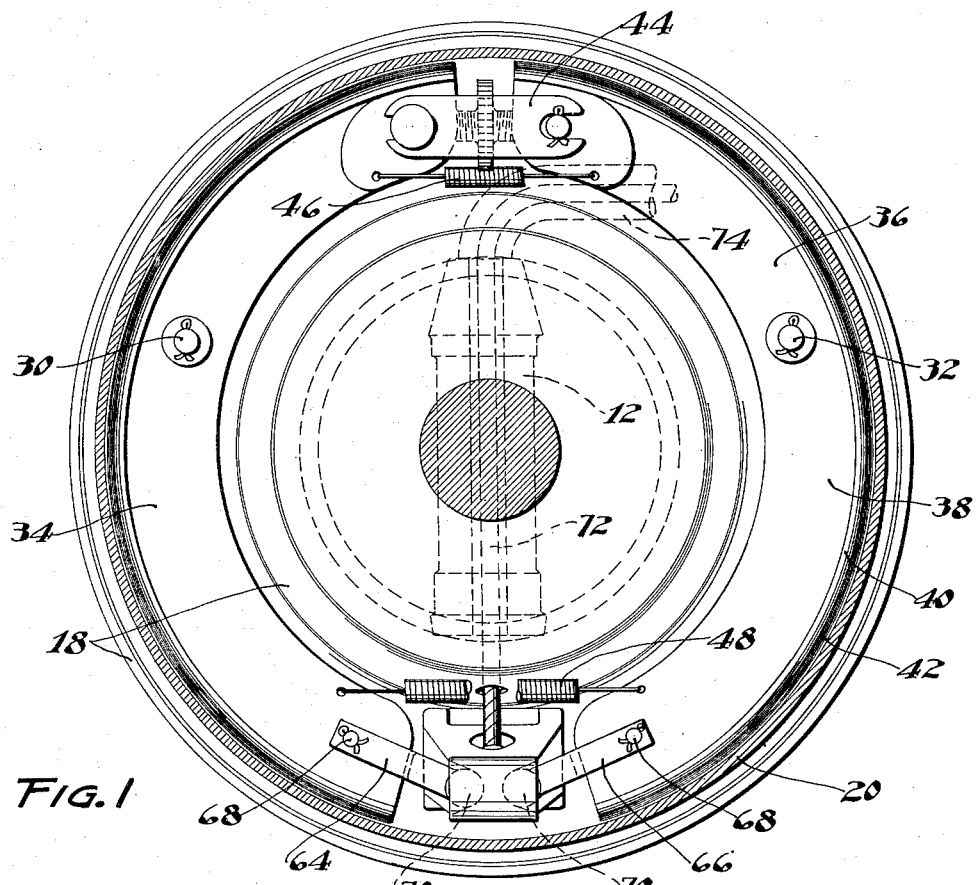
FIG. 1
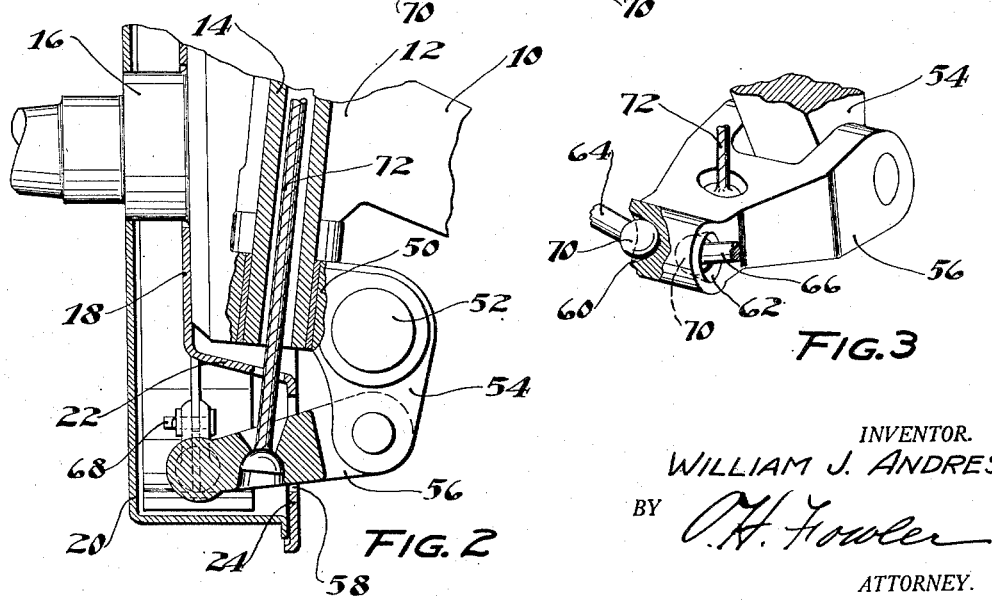
FIG. 2
FIG. 3
INVENTOR.
WILLIAM J. ANDRES
BY O. H. Fowler
ATTORNEY.

Patented Apr. 10, 1934

1,954,519

UNITED STATES PATENT OFFICE 1,954,519

BRAKE

William J. Andres, South Bend, Ind., assignor to Bendix Aviation Corporation, South Bend, Ind., a corporation of Delaware Application December 16, 1931, Serial No. 581,454

5 Claims. (Cl. 188—78)

This invention relates to brakes and more particularly to internal expanding brakes.

An object of the invention is to provide an actuating device for the friction elements of a brake, so that these elements may be applied with an equal distribution of the applied force.

Another object of the invention is to provide an actuating device for the friction elements of a brake having its applying means in the pivotal axis of the wheel with which the brake is associated.

Another object of the invention is to provide an actuating device for the friction elements of a brake associated with a swivel wheel and having but few parts so constructed and arranged that the swiveling of the wheel will in no way affect the operation of the brake.

A further object of the invention is to provide an actuator for the friction elements of a brake having means for applying the friction elements without click due to the friction element moving away from and returning to its anchor.

A further object of the invention is to provide a brake structure in which the friction element of the brake is lifted bodily to engage the brake drum prior to expanding the friction element.

Yet a further object of the invention is to provide a brake structure wherein the effectiveness of the brake is varied by radial movement of the anchor.

A feature of the invention is an actuating device for a friction element including a pivotal arm adapted to swing between the separable ends of the friction element in a plane transversely of the plane in which the friction elements are positioned, the arm being suitably connected to the respective ends of the friction element.

Another feature of the invention is a brake associated with a swiveling wheel having friction elements operable through a pivotal arm swiveling with the brake and having its free end positioned between the separable ends of the friction element and connected therewith through suitable linkage, the arm being movable in a plane transverse to the plane in which the friction elements are positioned and operable by a tension member extending through the swiveling axis of the wheel.

Other objects and features of the invention will appear from the following description taken in connection with the drawing, which forms a part of the specification, and in which:

Figure 1 is a vertical sectional view of the brake taken back of the head of the drum illustrating the friction elements in side elevation and showing the invention as applied;

Figure 2 is a vertical sectional view partly in section and partly broken away; and Figure 3 is a perspective view of the actuator partly broken away.

Referring to the drawing for more specific details of the invention, 10 represents the front axle of a motor vehicle. The axle has an eye 12 in which is positioned a hollow pivot pin 14 and a steering knuckle 16 is swivelled on the pin. A backing plate 18 is suitably secured to the knuckle, and associated with the backing plate is a rotatable drum 20 which may be secured to a wheel, not shown.

The backing plate 18 has an offset portion 22 supporting an annular portion 24 and positioned on the annular portion are suitable steady rests 30 and 32. The steady rests support interchangeable friction elements or shoes 34 and 36. Each shoe includes a web 38 supporting a rim 40 having suitably secured thereto a lining 42 adaptable for cooperation with the braking surface of the drum.

The shoes 34 and 36 are connected at their articulated ends by an expansible member 44 for adjusting the shoes to compensate for wear on the linings, and positioned between the separable ends of the shoes is an actuating device to be hereinafter described. A return spring 46 is connected between the articulated ends of the shoes, and an auxiliary return spring 48 is connected between the separable ends of the shoes. These springs serve to return the shoes when the brake is released, to the off position and to retain them in this position in proper spaced relation to the braking surface of the drum.

As shown, the steering knuckle has a sleeve 50 provided with a boss 52 supporting arm 54 to which is pivotally secured an arm 56 extending through an opening 58 in the backing plate. The free end of the arm 56 is positioned between the separable ends of the friction element. The arm 56 is adapted to swing in a plane transverse to the friction elements of the brake. The free end of the arm 56 is provided with oppositely disposed recesses or sockets 60 and 62 for the reception of the free ends of links 64 and 66 pivoted to the separable ends of the friction element.

Each of the links 64 and 66 has one end slotted to straddle the web of the shoe and is pivoted thereto by a pin 68, and the other end is provided with a ball 70 adapted to seat in the sockets 60 and 62. Suitably connected to the arm 56 is a tension member 72 extending through an opening in the offset portion 22 on the backing plate and through the pivot pin 14 and a conduit 74 to a suitable operating means, not shown.

In operation, force is applied to the tension member 72 to raise the arm 56 between the separable ends of the friction elements 34 and 36. As the arm 56 is raised force is transmitted through the links 64 and 66 to raise the friction element bodily to initially engage the drum opposite the applying means, as added force is applied through the links the separable ends of the friction elements are caused to engage the element with the braking surface of the drum and to anchor through the operating means.

As the friction element is moved into drum engagement it is given a slight circumferential movement due to the wiping action of the drum. In this movement the friction element does not move away from the anchor because movement of this element is arrested by the link 64 or 66 according to direction of drum rotation and the element anchors through one or the other of the links on the actuating device. Since the anchoring end of the friction element at no time leaves the actuator the presence of click, generally prevalent in brake structures, is avoided.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. A brake comprising a friction element having separable ends, a member movable transversely between the ends and links connecting the member to the ends, said member serving as an anchorage to take the braking torque of the friction element and also serving as an applying device to operate said element.

2. A brake comprising a fixed support, a drum associated therewith, a friction element adaptable for cooperation with the drum, and a movable anchoring and applying means for the friction element swinging in applying the brake substantially at right angles to the direction of anchoring torque thereagainst.

3. A brake comprising a fixed support a rotatable drum associated therewith, a friction element adaptable for cooperation with the drum, a combined anchoring and applying means therefor, and means cooperating with the combined means to insure that the friction element is moved bodily against the drum prior to full expansion thereof.

4. A brake comprising a hollow pivot pin, a steering knuckle swiveled on the pin, a backing plate on the steering knuckle, a friction element on the backing plate having separable ends, an arm on the steering knuckle, an arm pivoted to the arm on the steering knuckle, a tension member for applying force to the pivotal arm extending through the hollow pivot pin and pivotal connections between the separable ends of the friction elements and the pivotal arm.

5. A brake comprising a support, a hollow pivot pin on said support, a steering knuckle swiveled on the hollow pivot pin, a backing plate supported on the steering knuckle, a friction element on the backing plate having separable ends, an arm on the steering knuckle, an arm pivoted to the arm on the steering knuckle having its free end positioned between the separable ends of the friction element and provided with oppositely disposed sockets, links having one end pivoted to the separable ends of the friction element and provided with balls on the other end seated in the sockets and a tension member for moving the pivotal arm extending through the hollow pivot pin.

WILLIAM J. ANDRES.